(12) United States Patent
Yin et al.

(10) Patent No.: US 11,638,073 B2
(45) Date of Patent: Apr. 25, 2023

(54) RANGING DEVICE AND RANGING METHHOD

(71) Applicant: Guangzhou Tyrafos Semiconductor Technologies Co., LTD, Guangzhou (CN)

(72) Inventors: Ping-Hung Yin, Taipei (TW); Jia-Shyang Wang, Miaoli County (TW)

(73) Assignee: Guangzhou Tyrafos Semiconductor Technologies Co., LTD, Guangzhou (CN)

( * ) Notice: Subject to any disclaimer, the term of this patent is extended or adjusted under 35 U.S.C. 154(b) by 0 days.

(21) Appl. No.: 17/581,859

(22) Filed: Jan. 22, 2022

(65) Prior Publication Data

US 2022/0254044 A1    Aug. 11, 2022

(30) Foreign Application Priority Data

Feb. 9, 2021   (TW) ................................. 110104840

(51) Int. Cl.
| | |
|---|---|
| *G06T 7/521* | (2017.01) |
| *G06T 7/70* | (2017.01) |
| *G01S 7/48* | (2006.01) |
| *H04N 25/77* | (2023.01) |
| *G01S 17/48* | (2006.01) |
| *H04N 5/04* | (2006.01) |

(Continued)

(52) U.S. Cl.
CPC ............. *H04N 25/77* (2023.01); *G01S 17/48* (2013.01); *G06T 7/521* (2017.01); *G06T 7/70* (2017.01); *H04N 5/04* (2013.01); *H04N 23/56* (2023.01); *H04N 25/75* (2023.01); *G06T 2207/10028* (2013.01); *G06T 2207/10048* (2013.01)

(58) Field of Classification Search
CPC ........... H04N 23/56; G06T 7/521; G06T 7/70; G06T 2207/10028; G06T 2207/10048; G01S 17/48
See application file for complete search history.

(56) References Cited

U.S. PATENT DOCUMENTS

| | | | | |
|---|---|---|---|---|
| 8,279,418 B2* | 10/2012 | Yee | ......................... | G01S 17/66 356/3.01 |
| 9,014,433 B2* | 4/2015 | Kobayashi | ................ | G06T 7/70 348/46 |

(Continued)

FOREIGN PATENT DOCUMENTS

| | | |
|---|---|---|
| CN | 105303572 | 2/2016 |
| CN | 107370951 | 11/2017 |
| TW | 201510475 | 3/2015 |

*Primary Examiner* — Brian P Yenke
(74) *Attorney, Agent, or Firm* — JCIPRNET

(57) ABSTRACT

A ranging device and a ranging method are provided. The ranging device includes a light source, an image sensor, and a processor. The light source projects a plurality of projection patterns onto a surface of an object to be measured at different times. The image sensor senses the surface of the object to be measured in synchronization with projection times of the projection patterns to obtain a plurality of sensing images respectively corresponding to the projection patterns. The processor analyzes the sensing images to determine depth information of the object to be measured. The processor performs trigonometric calculations to obtain the depth information.

16 Claims, 4 Drawing Sheets

(51) Int. Cl.
*H04N 23/56* (2023.01)
*H04N 25/75* (2023.01)

(56) References Cited

U.S. PATENT DOCUMENTS

| | | | | |
|---|---|---|---|---|
| 9,041,914 | B2* | 5/2015 | Tohme | H04N 13/204 |
| | | | | 356/3.01 |
| 9,418,425 | B2* | 8/2016 | Park | G01S 17/36 |
| 10,234,561 | B2* | 3/2019 | Godbaz | H04N 13/122 |
| 10,872,461 | B2* | 12/2020 | But | G06T 7/11 |
| 11,132,804 | B2* | 9/2021 | Chan | G06T 7/521 |
| 11,158,074 | B1* | 10/2021 | Kantor | G06T 7/521 |
| 11,176,655 | B2* | 11/2021 | Akopyan | G01S 7/4802 |
| 11,320,537 | B2* | 5/2022 | Kimura | G01S 17/89 |
| 11,418,274 | B2* | 8/2022 | Yin | G01S 17/06 |
| 11,483,503 | B2* | 10/2022 | Kimura | H04N 23/11 |
| 11,525,902 | B2* | 12/2022 | Yin | G01S 7/4861 |
| 2002/0196415 | A1 | 12/2002 | Shiratani | |
| 2018/0176544 | A1 | 6/2018 | Wang et al. | |
| 2019/0064359 | A1* | 2/2019 | Yang | G01B 11/2513 |
| 2020/0184611 | A1* | 6/2020 | Tsai | G01S 17/48 |
| 2022/0163794 | A1* | 5/2022 | Hwangbo | G01S 17/48 |

\* cited by examiner

RANGING DEVICE AND RANGING METHHOD

CROSS-REFERENCE TO RELATED APPLICATION

This application claims the priority benefit of Taiwanese application no. 110104840, filed on Feb. 9, 2021. The entirety of the above-mentioned patent application is hereby incorporated by reference herein and made a part of this specification.

BACKGROUND

Technical Field

The disclosure relates to a measurement technology. Particularly, the disclosure relates to a ranging device and a ranging method.

Description of Related Art

Currently, in ranging technology, although time-of-flight (ToF) sensing can effectively obtain ranging results, realization of time-of-flight ranging usually requires relatively high-cost elements and complex calculation circuits. In view of this, several embodiments will be provided below on how to provide accurate ranging without disposing a ranging device with relatively high-cost elements and complex calculation circuits.

SUMMARY

The disclosure provides a ranging device and a ranging method, where depth information of an object to be measured can be accurately obtained.

A ranging device of the disclosure includes a light source, an image sensor, and a processor. The light source is configured to project a plurality of projection patterns onto a surface of an object to be measured at different times. The image sensor is configured to sense the surface of the object to be measured in synchronization with projection times of the projection patterns to obtain a plurality of sensing images respectively corresponding to the projection patterns. The processor is coupled to the light source and the image sensor. The processor analyzes the sensing images to determine depth information of the object to be measured. The processor performs trigonometric calculations to obtain the depth information.

A ranging method of the disclosure includes the following. A plurality of projection patterns are projected onto a surface of an object to be measured at different times by a light source. The surface of the object to be measured is sensed by an image sensor in synchronization with projection times of the projection patterns to obtain a plurality of sensing images respectively corresponding to the projection patterns. The sensing images are analyzed to determine depth information of the object to be measured. The depth information is generated by performing trigonometric calculations.

Based on the foregoing, with the ranging device and the ranging method of the disclosure, the depth information of the object to be measured may be accurately analyzed by obtaining the sensing images.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
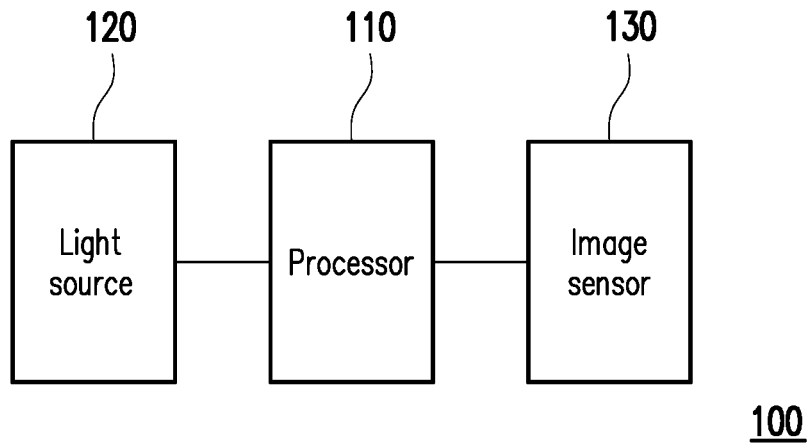
FIG. 1 is a schematic diagram of a ranging device according to an embodiment of the disclosure.

To make the content of the disclosure more comprehensible, the following embodiments are provided as examples according to which the disclosure can reliably be carried out. In addition, wherever possible, elements/members/steps using the same reference numerals in the drawings and embodiments denote the same or similar parts.

FIG. 1 is a schematic diagram of a ranging device according to an embodiment of the disclosure. With reference to FIG. 1, a ranging device 100 includes a processor 110, a light source 120, and an image sensor 130. The processor 110 is coupled to the light source 120 and the image sensor 130. In this embodiment, the processor 110 may drive the light source 120 to project a plurality of projection patterns onto a surface of an object to be measured at different times, and the processor 110 may drive the image sensor 130 in synchronization with times of projecting the projection patterns by the light source 120 to simultaneously operate the image sensor 130 to sense the projection result of the projection patterns on the surface of the object to be measured to obtain a plurality of sensing images corresponding to the projection patterns. Therefore, in this embodiment, the processor 110 may determine depth information of the object to be measured by analyzing the sensing images.

In this embodiment, the processor 110 may be, for example, a central processing unit (CPU), or any other programmable general-purpose or special-purpose microprocessor, digital signal processor (DSP), programmable controller, application specific integrated circuit (ASIC), programmable logic device (PLD), other similar processing devices, or a combination of these devices. The processor 110 may be configured to generate drive signals, perform signal processing, and perform relevant calculations. It is worth noting that the ranging device 100 of this embodiment is adapted for triangulation operation, and the processor 110 may perform relevant parameter calculations based on trigonometric relationships, including performing trigonometric calculations by the processor 110 to obtain the depth information (a distance parameter), for example.

In this embodiment, the light source 120 may be an infrared light source. In an embodiment, the light source 120 may be, for example, an infrared laser light source, and the light source 120 may further include relevant projection modules or lighting driving circuits, which is not limited by the disclosure. In this embodiment, the image sensor 130 may be a complementary metal-oxide semiconductor image sensor (CIS), and the image sensor 130 senses the image in an exposure manner of global shutter. It is worth noting that, since the image sensor 130 of this embodiment senses the image in the exposure manner of global shutter, when at least one of the ranging device 100 and the object to be measured is moving, pattern distortion of the sensing images obtained by the image sensor 130 can be effectively improved, and the ranging accuracy can be effectively enhanced.

Figure 2:
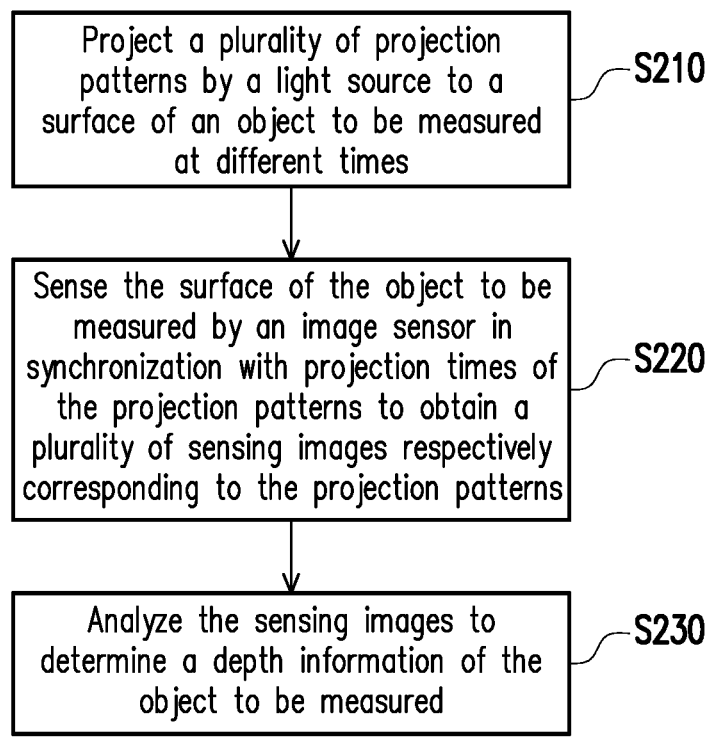
FIG. 2 is a flowchart of a ranging method according to an embodiment of the disclosure.

FIG. 2 is a flowchart of a ranging method according to an embodiment of the disclosure. With reference to FIG. 1 and FIG. 2, the ranging device 100 of this embodiment may perform steps S210 to S230 to realize ranging. In step S210, the ranging device 100 may project a plurality of projection patterns onto a surface of an object to be measured at different times by the light source 120. In step S220, the ranging device 100 may sense the surface of the object to be measured by the image sensor 130 in synchronization with projection times of the projection patterns to obtain a plurality of sensing images respectively corresponding to the projection patterns. In step S230, the ranging device 100 may analyze the sensing images to determine depth information of the object to be measured. In this embodiment, the depth information may be generated by performing trigonometric calculations by the processor 110 of the ranging device 100. Therefore, the ranging device 100 of the disclosure may obtain accurate ranging results with multiple times of projections and image sensing operations. Moreover, the implementation of steps S210 to S230 will be described in detail in the following embodiments.

Figure 3A:
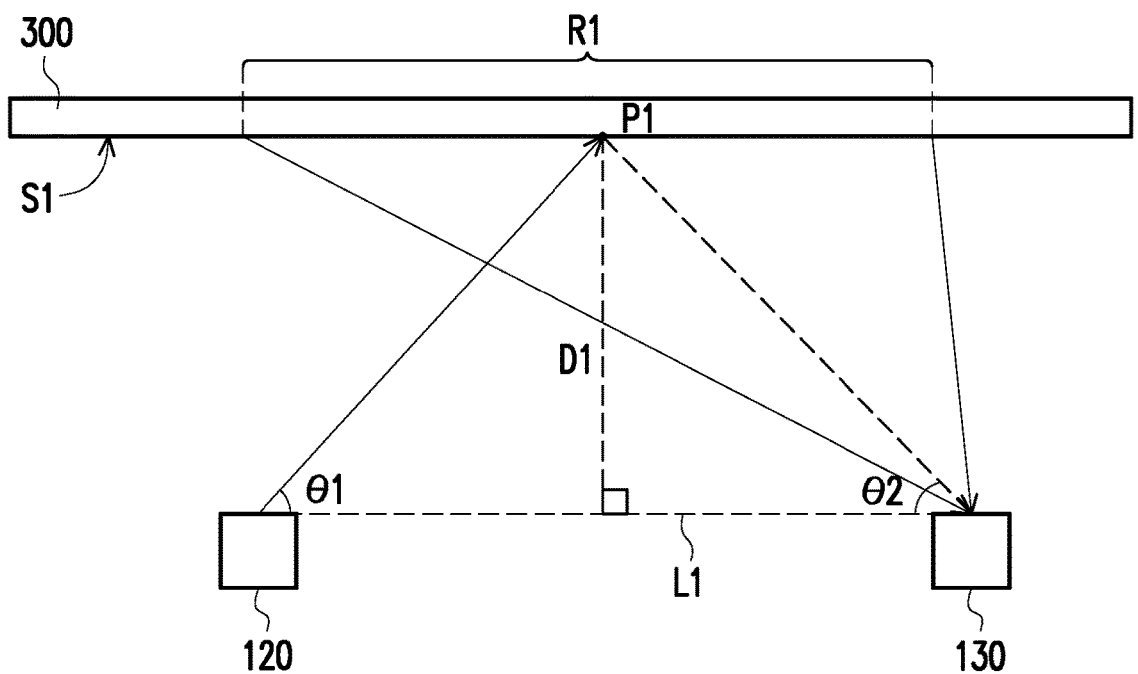
FIG. 3A is a schematic diagram of ranging operation according to an embodiment of the disclosure.

FIG. 3A is a schematic diagram of ranging operation according to an embodiment of the disclosure. With reference to FIG. 1 and FIG. 3A, this embodiment is used to describe a triangulation operation (calculation) performed by the ranging device 100 of the disclosure. In addition, FIG. 3A is a schematic plan view. In this embodiment, the light source 120, for example, projects a projection pattern P1 onto a surface S1 of an object to be measured 300. The projection pattern P1 may be, for example, a light spot or a stripe. The image sensor 130 may photograph the surface S1 of the object to be measured 300 to obtain sensing images. In this embodiment, the light source 120 and the image sensor 130 may be fixedly disposed at fixed positions of an electronic device or a carrier. In this embodiment, given that the light emission angle of the light source 120 is known (predetermined), the processor 110 may obtain an angle θ1 in advance. Moreover, a distance L1 between the light source 120 and the image sensor 130 is known. Furthermore, given that the viewing angle of the image sensor 130 is known, the processor 110 may further calculate an angle θ2 by determining a position of the projection pattern P1 in the sensing images of the image sensor 130 (e.g., a position of the projection pattern P1 in an image capturing range R1). Finally, the processor 110 may perform relevant parameter calculations (trigonometric calculations) based on trigonometric relationships according to the angle θ1, the angle θ2, and the distance L1, and obtain a distance parameter D1 between the object to be measured 300 and the ranging device 100.

Figure 3B:
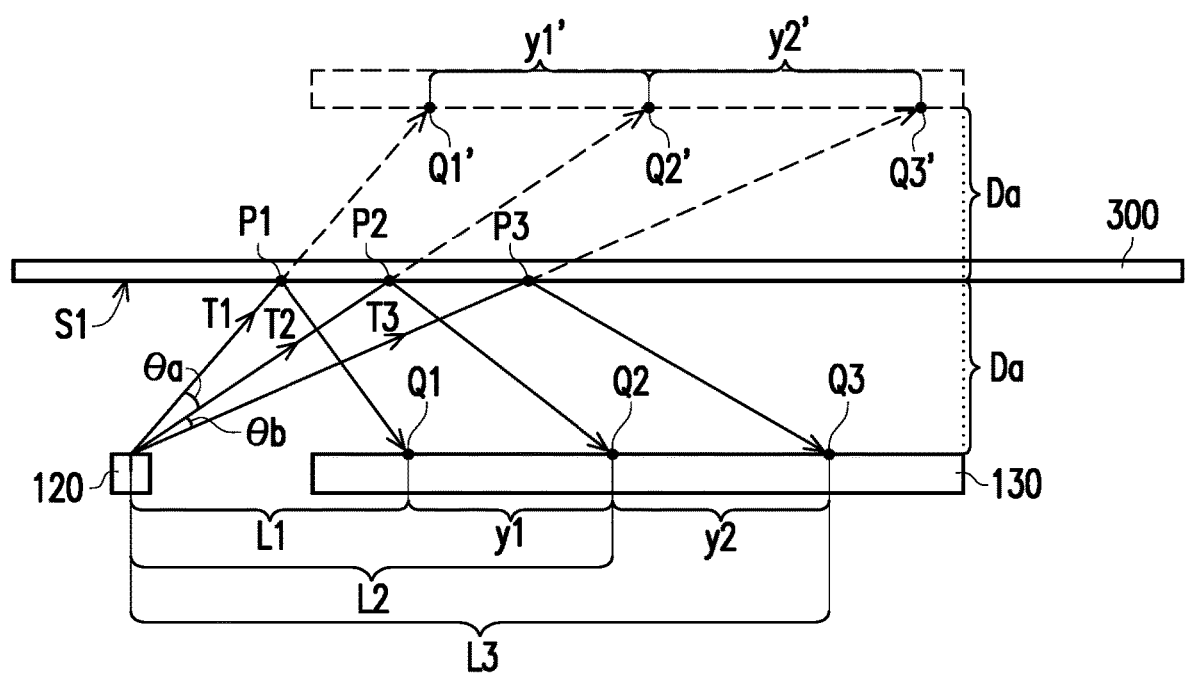
FIG. 3B is a schematic diagram of ranging operation according to another embodiment of the disclosure.

FIG. 3B is a schematic diagram of ranging operation according to another embodiment of the disclosure. With reference to FIG. 1 and FIG. 3B, this embodiment is used to describe another triangulation operation (another trigonometric calculation) performed by the ranging device 100 of the disclosure. In addition, FIG. 3B is a schematic plan view. In this embodiment, the light source 120, for example, emits sensing rays T1, T2, and T3 to project projection patterns P1, P2, and P3 onto the surface S1 of the object to be measured 300. The projection patterns P1, P2, and P3 may be, for example, light spots or stripes. The image sensor 130 may photograph the surface S1 of the object to be measured 300 to obtain sensing images. In this embodiment, the light source 120 and the image sensor 130 may be fixedly disposed at fixed positions of an electronic device or a carrier. In this embodiment, an included angle θa between the sensing rays T1 and T2 is known (predetermined), and an included angle θb between the sensing rays T2 and T3 is known (predetermined). The sensing rays T1 to T3 are reflected to the image sensor 130 by the surface S1 of the object to be measured 300. The processor 110 may perform the calculation described above for example, to obtain distances L1 to L3 between imaging positions Q1 to Q3 of the sensing rays T1 to T3 being reflected by the surface S1 of the object to be measured 300 and imaged on the image sensor 130 (or positions of the projection patterns in the sensing images) and the light source 120. Next, the processor 110 may further calculate a distance y1 between the imaging position Q1 and the imaging position Q2 and a distance y2 between the imaging position Q2 and the imaging position Q3.

In this regard, as shown in FIG. 3B, with reference to the result of virtual light paths of the sensing rays T1 to T3 on the virtual side, distances y1' and y2' between virtual imaging positions Q1' to Q3' on the virtual side are the same as the distances y1 and y2 between the imaging positions Q1 to Q3. Therefore, when the distance between the ranging device 100 (including the light source 120 and the image sensor 130) and the object to be measured 300 increases, it may be inferred that the distances y1 and y2 between the imaging positions Q1 to Q3 may also increase correspondingly. Therefore, if the surface S1 of the object to be measured 300 is a curved surface (non-planar surface), then the processor 110 may calculate a distance between the image sensor 130 and a point between the projection patterns P1 and P2 according to the distance y1, and calculate a distance between the image sensor 130 and a point between the projection patterns P2 and P3 according to the distance y2, and can effectively obtain more accurate depth information of the surface S1 of the object to be measured 300, for example, the result of depth change of the surface, or a distance Da between the ranging device 100 and the surface S1 of the object to be measured 300.

Figures 4A, 4B, 4C:
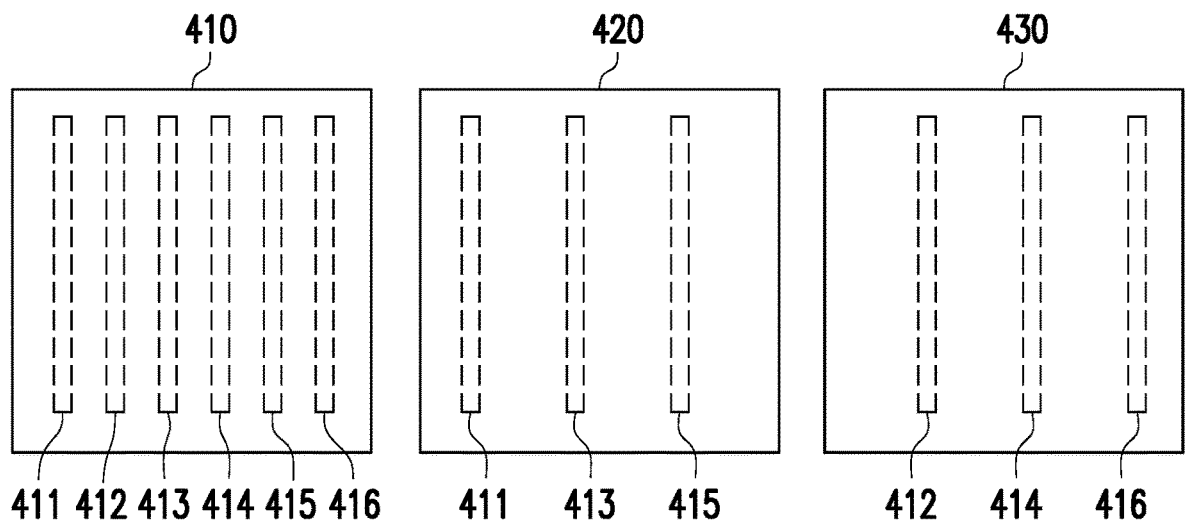
FIG. 4A is a schematic diagram of an original reference pattern according to an embodiment of the disclosure.
FIG. 4B is a schematic diagram of a first projection pattern according to an embodiment of the disclosure.
FIG. 4C is a schematic diagram of a second projection pattern according to an embodiment of the disclosure.
Figure 5:
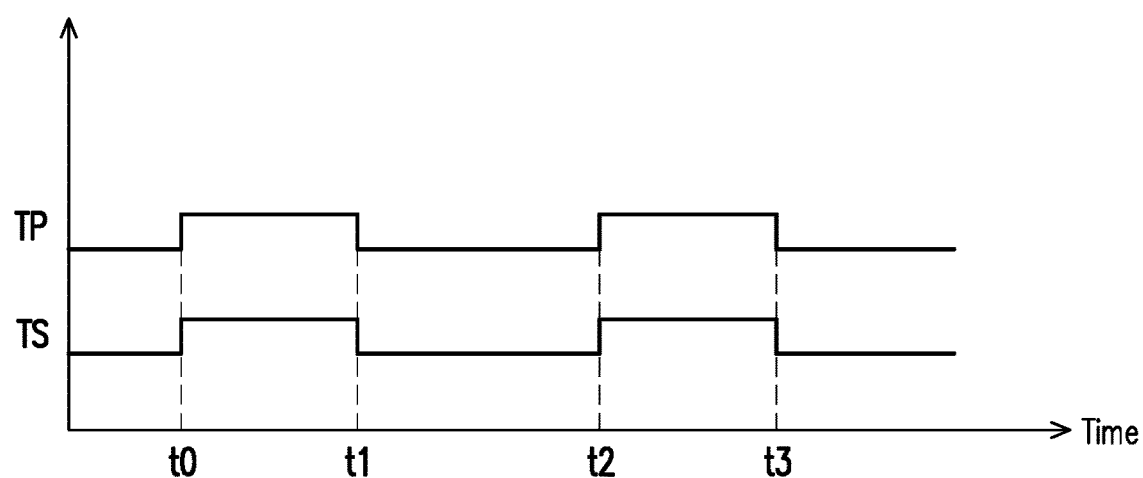
FIG. 5 is a diagram showing operation timing of a ranging device according to an embodiment of the disclosure.

FIG. 4A is a schematic diagram of an original reference pattern according to an embodiment of the disclosure. FIG. 4B is a schematic diagram of a first projection pattern according to an embodiment of the disclosure. FIG. 4C is a schematic diagram of a second projection pattern according to an embodiment of the disclosure. FIG. 5 is a diagram showing operation timing of a ranging device according to an embodiment of the disclosure. With reference to FIG. 1 and FIG. 4A to FIG. 5, in this embodiment, the projection patterns projected by the light source 120 may have, for example, a plurality of stripe patterns. First, with reference to FIG. 4A, in this embodiment, an original reference pattern 410 may include a plurality of stripe patterns 411 to 416 or other patterns of structured light. In this regard, since the surface of the object to be measured may be a non-smooth surface such as an irregular surface, a rough surface, or the like, resulting in possible occurrences of overlapped stripe patterns between the stripe patterns 411 to 416 projected on the surface of the object to be measured by the light source 120 based on the original reference pattern 410, the sequence or arrangement relationship of the stripe patterns in the sensing images obtained by the image sensor 130 may not be correctly identified, resulting in erroneous determination. Therefore, the original reference pattern 410 may be disassembled by the ranging device 100 of this embodiment to be divided into a first projection pattern 420 shown in FIG. 4B and a second projection pattern 430 shown in FIG. 4C. In this embodiment, the first projection pattern 420 may include the stripe patterns 411, 413, and 415, and the second projection pattern 430 may include the stripe patterns 412, 414, and 416. The stripe patterns 411, 413, and 415 may be stripe patterns in odd numbers in the original reference pattern 410, and the stripe patterns 412, 414, and 416 may be stripe patterns in even numbers in the original reference pattern 410.

In this embodiment, the light source 120 is in synchronization with the image sensor 130. Therefore, as shown by a projection timing TP and a sensing timing TS of FIG. 5, the light source 120 first projects the first projection pattern 420 onto the surface of the object to be measured during the period from time t0 to time t1, and the image sensor 130 simultaneously senses (photographs) the surface of the object to be measured during the period from time t0 to time t1 to obtain a first sensing image corresponding to the first projection pattern 420. Next, the light source 120 projects the second projection pattern 430 onto the surface of the object to be measured during the period from time t2 to time t3, and the image sensor 130 simultaneously senses (photographs) the surface of the object to be measured during the period from time t2 to time t3 to obtain a second sensing image corresponding to the second projection pattern 430. In other words, the ranging device 100 may perform two times of projection operations and two times of sensing (photographing) operations in one time of ranging operation.

In this embodiment, the ranging device 100 may first sense the stripe patterns 411, 413, and 415 by the image sensor 130 and perform the calculations as described in the above embodiments of FIG. 3A and FIG. 3B by the processor 110, and obtain a part of the depth information of the surface of the object to be measured. Next, the ranging device 100 may sense the stripe patterns 412, 414, and 416 by the image sensor 130 and perform the above calculations of FIG. 3A and FIG. 3B by the processor 110, and obtain another part of the depth information of the surface of the object to be measured. Therefore, the processor 110 may combine the sensing results of the first projection pattern 420 and the second projection pattern 430 to effectively obtain the complete depth information of the surface of the object to be measured.

Alternatively, in an embodiment, the processor 110 may respectively analyze the first sensing image and the second sensing image to determine distribution positions and arrangement sequences of the stripe patterns 411, 413, and 415 and the stripe patterns 412, 414, and 416 respectively in the first sensing image and the second sensing image (e.g., calculate the coordinate parameters of the patterns in the images). In this embodiment, the processor 110 may record the distribution positions and the arrangement sequences of the stripe patterns 411, 413, and 415 and the stripe patterns 412, 414, and 416 respectively in the first sensing image and the second sensing image. Moreover, the processor 110 may overlay the first sensing image and the second sensing image to generate an overlay image. The overlay image includes the stripe patterns 411 to 416. The processor 110 may analyze the position relationship between the stripe patterns 411 to 416 in the overlay image to holistically analyze and calculate a plurality of distance parameters between the object to be measured and the ranging device 100, and may, for example, perform the calculations as described in the above embodiments of FIG. 3A and FIG. 3B on the stripe patterns 411 to 416 in the overlay image.

Figure 6A:
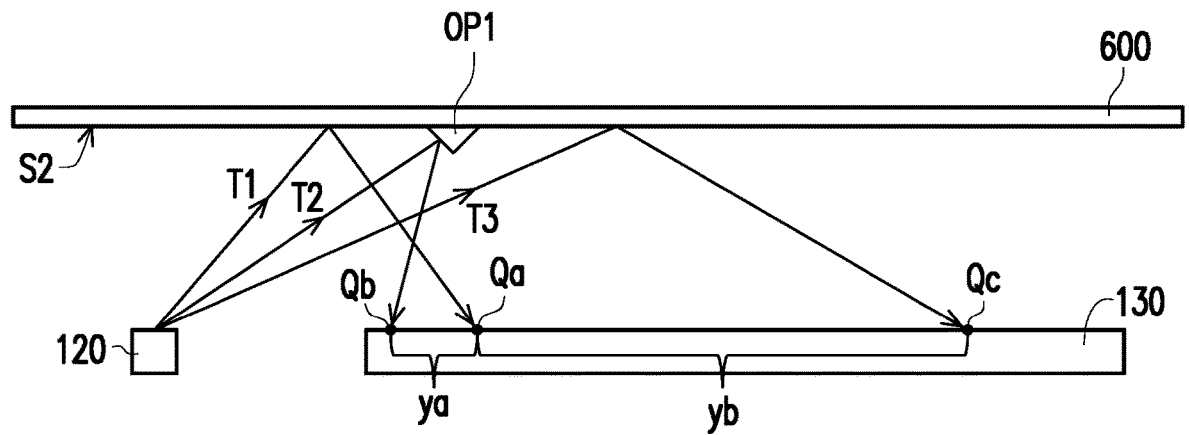
FIG. 6A is a schematic diagram of ranging operation for an object to be measured with an obstacle on a surface thereof according to an embodiment of the disclosure.
Figure 6B:
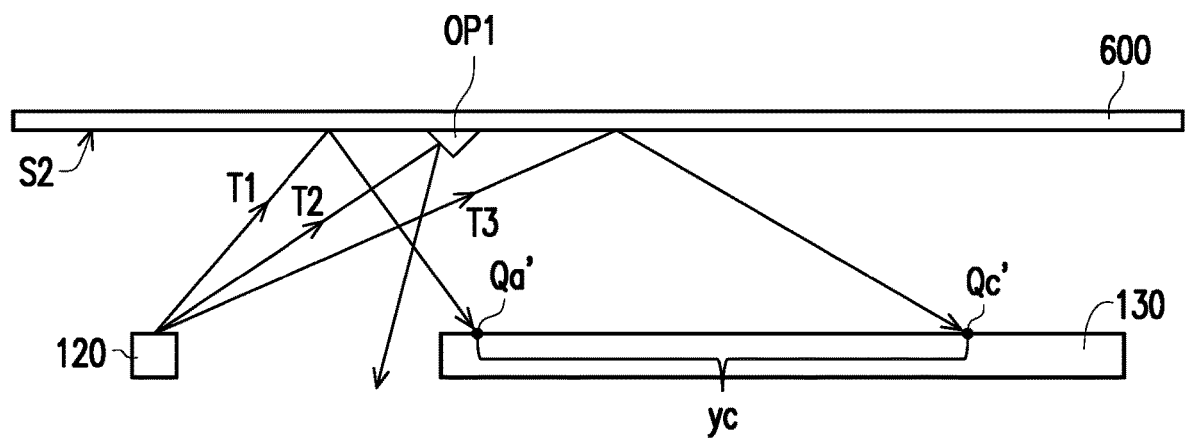
FIG. 6B is a schematic diagram of ranging operation for an object to be measured with an obstacle on a surface thereof according to another embodiment of the disclosure.

FIG. 6A is a schematic diagram of ranging operation for an object to be measured with an obstacle on a surface thereof according to an embodiment of the disclosure. FIG. 6B is a schematic diagram of ranging operation for an object to be measured with an obstacle on a surface thereof according to another embodiment of the disclosure. The processor 110 of the ranging device 100 may operate the light source 120 to emit the sensing rays T1 to T3 corresponding to a plurality of projection patterns to a surface S2 of an object to be measured 600. With reference to FIG. 1 and FIG. 6A, the ranging device 100 may perform ranging operation (or depth sensing operation) on the object to be measured 600. As shown in FIG. 6A, an obstacle OP1 may be present on the surface S2 of the object to be measured 600, and as a result, an imaging position Qb of the sensing ray T2 emitted by the light source 120 toward the surface S2 of the object to be measured 600, reflected by the obstacle OP1, and imaged on the image sensor 130 is not between imaging positions Qa and Qc. The imaging positions Qa and Qc are the imaging positions at which the sensing rays T1 and T3 are reflected by the surface S2 of the object to be measured 600 and imaged on the image sensor 130. A distance ya is between the imaging position Qa and the imaging position Qb, and a distance yb is between the imaging position Qa and the imaging position Qc. Therefore, if the light source 120 emits the sensing rays T1 to T3 at the same time, the processor 110 cannot determine the correct sequence of the imaging positions Qa, Qb, and Qc imaged on the image sensor 130. In this regard, the processor 110 may erroneously determine the imaging position Qa to be corresponding to the sensing ray T2, and erroneously determine the imaging position Qb to be corresponding to the sensing ray T1.

Therefore, in this embodiment, the processor 110 of the ranging device 100 may operate the light source 120 to sequentially and time-divisionally emit the sensing rays T1 to T3, so that the processor 110 can correctly determine the correct sequence of the imaging positions Qa, Qb, and Qc according to the sensing images sequentially received by the image sensor 130 at the imaging position Qa, the imaging position Qb, and the imaging position Qc on the image sensor 130 corresponding to the sensing rays T1 to T3. For example, if the processor 110 determines that the imaging positions Qa, Qb, and Qc are not arranged along a specific direction, the processor 110 may determine that the imaging position Qb is in an abnormal sensing result according to the imaging sequence and the imaging position thereof. In addition, the processor 110 can further effectively determine that the corresponding sensing ray T2 may be affected by the obstacle OP1 on the surface S2 of the object to be measured 600. Therefore, the processor 110 may ignore the sensing result of the imaging position Qb, and calculate the distance between the ranging device 100 and the object to be measured 600 or depth information of the surface S2 of the object to be measured 600 utilizing the imaging positions Qa and Qc.

In other words, the processor 110 of this embodiment may determine that at least a part of the sensing images are a plurality of effective sensing images according to a projection sequence of the projection patterns corresponding to the sensing rays T1 to T3 and the positions of the projection patterns respectively in the sensing images, and calculate depth information of the object to be measured 600 according to the effective sensing images.

With reference to FIG. 1 and FIG. 6B, in another case, as shown in FIG. 6B, the obstacle OP1 may be present on the surface S2 of the object to be measured 600, and as a result, an imaging position Qb' of the sensing ray T2 emitted by the light source 120 toward the surface S2 of the object to be measured 600, reflected by the obstacle OP1, and imaged on the image sensor 130 is not between imaging positions Qa' and Qc' of the sensing rays T1 and T3 reflected by the surface S2 of the object to be measured 600 and imaged on the image sensor 130. A distance yc is between the imaging position Qa' and the imaging position Qc'. Furthermore, it is possible that the sensing ray T2 is not imaged on the image sensor 130 after being reflected. Therefore, if the light source 120 emits the sensing rays T1 to T3 at the same time, the processor 110 cannot determine to which of the sensing rays the imaging positions Qa' and Qc' imaged on the image sensor 130 respectively correspond. In this regard, the processor 110 may erroneously determine the imaging position Qc' to be corresponding to the sensing ray T2.

Therefore, in this embodiment, the processor 110 of the ranging device 100 may operate the light source 120 to sequentially and time-divisionally emit the sensing rays T1 to T3, so that the processor 110 can correctly determine the correct sequence of the imaging positions Qa' and Qc' according to the sensing images sequentially received by the image sensor 130 at the imaging position Qa' and the imaging position Qc' on the image sensor 130 corresponding to the sensing rays T1 and T3. For example, if the processor 110 determines that the image sensor 130 does not receive the sensing ray T2, the processor 110 can effectively determine that the sensing ray T2 corresponding to the imaging position Qb' may be affected by the obstacle OP1 on the surface S2 of the object to be measured 600. Therefore, the processor 110 may ignore the sensing result of the sensing ray T2, and calculate the distance between the ranging device 100 and the object to be measured 600 or depth information of the surface S2 of the object to be measured 600 utilizing the imaging positions Qa' and Qc'.

Then, with reference to FIG. 4A to FIG. 4C, the emission of sensing rays described above may be applicable to FIG. 4A to FIG. 5. In an exemplary embodiment, the processor 110 of the ranging device 100 may operate the light source 120 to individually project the stripe patterns 411 to 416 onto the surface of the object to be measured for the image sensor 130 to individually photograph. In addition, the processor 110 individually analyzes the projection results of the stripe patterns 411 to 416. In other words, the ranging device 100 may perform six times of projection operations and six times of sensing (photographing) operations in one time of ranging operation. Moreover, after determining the positions and the arrangement sequence of the projection results of the stripe patterns 411 to 416, the processor 110 may also combine the sensing images to generate an overlay image. Therefore, the processor 110 may obtain the complete depth information of the surface of the object to be measured by analyzing the overlay image.

Alternatively, in another exemplary embodiment, the processor 110 of the ranging device 100 may operate the light source 120 to first sequentially and time-divisionally project the stripe patterns 411, 413, and 415 of the first projection pattern 420 during the period from time t0 to time t1 for the image sensor 130 to individually photograph. In addition, the processor 110 individually analyzes the projection results of the stripe patterns 411, 413, and 415, and obtains a part of the depth information of the surface of the object to be measured. Next, the processor 110 of the ranging device 100 may operate the light source 120 to first sequentially and time-divisionally project the stripe patterns 412, 414, and 416 of the second projection pattern 430 during the period from time t2 to time t3 for the image sensor 130 to individually photograph. In addition, the processor 110 individually analyzes the projection results of the stripe patterns 412, 414, and 416, and obtains a part of the depth information of the surface of the object to be measured. Therefore, the processor 110 may combine the respective multiple sensing results of the first projection pattern 420 and the second projection pattern 430, effectively obtain the complete depth information of the surface of the object to be measured, and can effectively prevent erroneous determination in the measurement caused by the obstacle on the surface of the object to be measured.

In summary of the foregoing, in the ranging device and the ranging method of the disclosure, the sensing images may be obtained by time-divisionally projecting different projection patterns onto the surface of the object to be measured and synchronously sensing the projection results of the projection patterns on the surface of the object to be measured. In the ranging device and the ranging method of the disclosure, the depth information of the object to be measured may be accurately obtained by analyzing the sensing images.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A ranging device, comprising:
   a light source configured to project a plurality of projection patterns onto a surface of an object to be measured at different times;
   an image sensor configured to sense the surface in synchronization with projection times of the projection patterns of the object to be measured to obtain a plurality of sensing images respectively corresponding to the projection patterns; and
   a processor coupled to the light source and the image sensor and configured to analyze the sensing images to determine depth information of the object to be measured, wherein the processor performs a trigonometric calculation to obtain the depth information,
   wherein when a sequence of positions of the projection patterns in the sensing images does not conform to a projection sequence of the projection patterns, the processor determines the depth information by ignoring at least a part of the sensing images.

2. The ranging device according to claim 1, wherein the processor determines that at least a part of the sensing images are a plurality of effective sensing images according to the projection sequence of the projection patterns and the positions of the projection patterns respectively in the sensing images, and calculate the depth information of the object to be measured according to the effective sensing images.

3. The ranging device according to claim 1, wherein the projection patterns comprise a first projection pattern having a plurality of stripe patterns and a second projection pattern having a plurality of other stripe patterns, and the stripe patterns and the other stripe patterns are alternately arranged in an original reference pattern.

4. The ranging device according to claim 3, wherein the processor calculates a part of the depth information of the object to be measured according to a first sensing image corresponding to the stripe patterns of the first projection pattern, and the processor calculates another part of the depth information of the object to be measured according to a second sensing image corresponding to the stripe patterns of the second projection pattern.

5. The ranging device according to claim 3, wherein the processor overlays a first sensing image corresponding to the stripe patterns of the first projection pattern and a second sensing image corresponding to the stripe patterns of the second projection pattern to obtain an overlay image, and the processor analyzes positions of the projection patterns in the overlay image to determine the depth information of the object to be measured.

6. The ranging device according to claim 1, wherein the image sensor comprises a complementary metal-oxide semiconductor image sensor.

7. The ranging device according to claim 1, wherein the image sensor senses an image in a manner of global shutter.

8. The ranging device according to claim 1, wherein the light source comprises an infrared light source.

9. A ranging method, comprising:
projecting a plurality of projection patterns onto a surface of an object to be measured at different times by a light source;
sensing the surface of the object to be measured by an image sensor in synchronization with projection times of the projection patterns to obtain a plurality of sensing images respectively corresponding to the projection patterns;
analyzing the sensing images to determine depth information of the object to be measured, wherein the depth information is generated by performing trigonometric calculations; and
when a sequence of positions of the projection patterns in the sensing images does not conform to a projection sequence of the projection patterns, determining the depth information by ignoring at least a part of the sensing images.

10. The ranging method according to claim 9, wherein analyzing the sensing images to determine the depth information of the object to be measured comprises:
determining that at least a part of the sensing images are a plurality of effective sensing images according to the projection sequence of the projection patterns and the positions of the projection patterns respectively in the sensing images; and
calculating the depth information of the object to be measured according to the effective sensing images.

11. The ranging method according to claim 9, wherein the projection patterns comprise a first projection pattern having a plurality of stripe patterns and a second projection pattern having a plurality of other stripe patterns, and the stripe patterns and the other stripe patterns are alternately arranged in an original reference pattern.

12. The ranging method according to claim 11, wherein analyzing the sensing images to determine the depth information of the object to be measured comprises:
calculating a part of the depth information of the object to be measured according to a first sensing image corresponding to the stripe patterns of the first projection pattern; and
calculating another part of the depth information of the object to be measured according to a second sensing image corresponding to the stripe patterns of the second projection pattern.

13. The ranging method according to claim 11, wherein analyzing the sensing images to determine the depth information of the object to be measured comprises:
overlaying a first sensing image corresponding to the stripe patterns of the first projection pattern and a second sensing image corresponding to the stripe patterns of the second projection pattern to obtain an overlay image; and
analyzing positions of the projection patterns in the overlay image to determine the depth information of the object to be measured.

14. The ranging method according to claim 9, wherein the image sensor comprises a complementary metal-oxide semiconductor image sensor.

15. The ranging method according to claim 9, wherein the image sensor senses an image in a manner of global shutter.

16. The ranging method according to claim 9, wherein the light source comprises an infrared light source.

* * * * *